United States Patent
Inaba (10) Patent No.: US 9,056,273 B2
(45) Date of Patent: Jun. 16, 2015

(54) WET TYPE EXHAUST GAS DESULFURIZATION APPARATUS

(71) Applicant: MITSUBISHI HEAVY INDUSTRIES, LTD., Tokyo (JP)

(72) Inventor: Norikazu Inaba, New York, NY (US)

(73) Assignee: MITSUBISHI HITACHI POWER SYSTEMS, LTD., Yokohama (JP)

(*) Notice: Subject to any disclaimer, the term of this patent is extended or adjusted under 35 U.S.C. 154(b) by 266 days.

(21) Appl. No.: 13/889,863

(22) Filed: May 8, 2013

(65) Prior Publication Data

US 2014/0056775 A1  Feb. 27, 2014

Related U.S. Application Data

(60) Provisional application No. 61/692,396, filed on Aug. 23, 2012.

(51) Int. Cl.
*B01D 53/50* (2006.01)

(52) U.S. Cl.
CPC .............. *B01D 53/50* (2013.01); *B01D 53/504* (2013.01)

(58) Field of Classification Search
CPC ...... B01D 1/00; B01D 1/0011; B01D 1/0041; B01D 1/0047; B01D 1/0052; B01D 1/0094; B01D 2011/002; B01D 2011/005; B01D 2011/00; B01D 2011/02; B01D 23/00; B01D 2258/0283; B01D 53/50; B01D 53/504

USPC ........... 96/234, 235, 236, 240, 241, 242, 243, 96/265, 267

See application file for complete search history.

(56) References Cited

U.S. PATENT DOCUMENTS 6,863,875 B1 * 3/2005 Kotake et al. ................. 423/235

FOREIGN PATENT DOCUMENTS

JP    02-27870 Y2    7/1990

* cited by examiner

*Primary Examiner* — Duane Smith
*Assistant Examiner* — Cabrena Holecek
(74) *Attorney, Agent, or Firm* — Westerman, Hattori, Daniels & Adrian, LLP (57) ABSTRACT

A wet type flue gas desulfurization apparatus desulfurizes flue gas existing inside an absorption tower by causing the flue gas to come into gas-liquid contact with an absorbent, and the absorbent is fed through a header pipe and sprayed through nozzles. In the apparatus, the absorbent accumulated inside the absorption tower is fed to the nozzles to circulate in the absorption tower. The apparatus includes: a bypass pipe feeding the absorbent through the nozzles from a downstream of the nozzles into the absorption tower; a tank arranged at an intermediate location on the bypass pipe; a perforated plate arranged inside the tank; and an access port opening on a side surface of the tank above the perforated plate to communicate between an inside and an outside of the tank. The absorbent that freely falls and passes through the perforated plate while scales or impurities are collected above the perforated plate.

6 Claims, 4 Drawing Sheets

WET TYPE EXHAUST GAS DESULFURIZATION APPARATUS

BACKGROUND OF THE INVENTION

1. Field of the Invention

The present invention relates to a wet type flue gas desulfurization apparatus that can desulfurize flue gas by causing the flue gas to come into gas-liquid contact with an absorbent.

2. Description of the Related Art

Flue gas generated in large combustion facilities, such as a plant or the like, includes $SO_X$ (sulfur oxide), such as sulfur dioxide ($SO_2$). Accordingly, it is desired to remove sulfur oxides from (i.e., to desulfurize) flue gas. In order to desulfurize flue gas, a wet type flue gas desulfurization apparatus has been widely used, and this wet type flue gas desulfurization apparatus desulfurizes flue gas by using an absorbent that includes an alkaline material, such as alkaline metal (this type of flue gas desulfurization apparatus will hereafter be simply referred to as a "FGD apparatus"). A FGD apparatus employs a limestone gypsum method, a magnesium hydroxide method, a sodium hydroxide method, an ammonia absorption method, or the like. In particular, the limestone gypsum method is used in very many FGD apparatuses. In many cases, when the limestone gypsum method is employed, limestone slurry which is produced by suspending a limestone ($CaCO_3$ (calcium carbonate)) in water, is used as an absorbent. In general, in a FGD apparatus, flue gas is desulfurized by coming into gas-liquid contact with the absorbent that has been sprayed from nozzles inside an absorption tower. Furthermore, the absorbent contacted in the desulfurization process is circulated within the FGD apparatus, and therefore, is repeatedly contacted within the FGD apparatus.

However, in many cases, the absorbent flowing in a circulation path may contain: scales, such as calcium sulfite ($CaSO_3$) or calcium sulfate ($CaSO_4$) or the like, which may be generated in the desulfurization process; and impurities which may intrude from outside. The scales and the impurities (hereinafter collectively referred to as "scales etc.") may cause clogging in nozzles and the circulation path. The absorbent may not be appropriately sprayed from the nozzles due to the clogging so that the desulfurization efficiency may degrade. As a result, the FGD apparatus cannot be stably operated. In order to solve the above-described problem, a related FGD apparatus is provided with a mesh for collecting the scales etc., and the mesh is arranged in the absorbent circulation path. In addition, in a related FGD apparatus discussed in Japanese Utility Model Registration Publication No. 02-027870, a grinding mechanism for grinding scales and the like, is provided in the absorbent circulation path.

SUMMARY OF THE INVENTION

However, in the related FGD apparatus described above, the scales etc. that are collected by the mesh, and the scales etc. which are ground by the grinding mechanism, may remain and accumulate in the absorbent circulation path. It becomes difficult for the absorbent to flow through the circulation path due to the accumulation of the scales etc. Accordingly, the absorbent may not be appropriately sprayed from the nozzles in this case. Therefore, the desulfurization efficiency may degrade, and as a result, the FGD apparatus cannot be stably operated. In order to solve the accumulation of scales etc., it is necessary to carry out maintenance operations for removing the scales etc. remaining in the circulation path. However, because the inside of the circulation path is very narrow, it is very difficult to carry out the maintenance operation for removing such scales etc. that remain in the inside of the circulation path. Furthermore, in order to remove the accumulated scales etc., it is necessary to stop the operation of the FGD apparatus. Accordingly, the FGD apparatus cannot be continuously and stably operated.

Considering the circumstances described above and in order to solve the above-described problems, the present invention relates to a wet type flue gas desulfurization apparatus which can prevent clogging of an absorbent circulation path occurring due to accumulated scales and impurities, can be stably operated, and can be maintained and repaired easily.

In order to solve the above-described problems, according to an aspect of the present invention, a wet type flue gas desulfurization apparatus includes: an absorption tower configured to desulfurize flue gas by causing the flue gas to come into gas-liquid contact with an absorbent; nozzles configured to spray the absorbent into the absorption tower; a header pipe configured to feed the absorbent to the nozzles; a circulation mechanism configured to feed the absorbent accumulated inside the absorption tower through the nozzles of the header pipe toward an upstream of a flow of the absorbent; a bypass pipe configured to feed the absorbent through the nozzles of the header pipe from a downstream of the nozzles into the absorption tower in a direction of flow of the absorbent; a tank arranged at an intermediate location on the bypass pipe in the direction of flow of the absorbent; a perforated plate being arranged inside the tank and having multiple transmission holes; and an access port which opens on a side surface of the tank to communicate between an inside and an outside of the tank. In the wet type flue gas desulfurization apparatus, the access port is arranged above the perforated plate and the absorbent that freely falls inside the tank passes through the transmission holes of the perforated plate while scales or impurities contained in the absorbent are collected above of the perforated plate.

According to an aspect of the present invention, in the wet type flue gas desulfurization apparatus, the perforated plate is provided with an upper surface configured to slope upward from below in the horizontal direction toward the access port.

According to an aspect of the present invention, the wet type flue gas desulfurization apparatus is provided with an auxiliary meshed portion extending upward from an upper end portion of the inclined upper surface of the perforated plate, and having multiple transmission holes. In the wet type flue gas desulfurization apparatus, the absorbent passes through the transmission holes of the auxiliary perforated plate while the scales etc. or impurities contained in the absorbent are collected by the auxiliary perforated plate.

According to an aspect of the present invention, the wet type flue gas desulfurization apparatus further includes: restriction orifices arranged on the bypass pipe on the upstream side of the tank; and a flow rate control valve arranged on the bypass pipe on the upstream side of the tank. In the wet type flue gas desulfurization apparatus, the restriction orifices and the flow rate control valve can control the flow rate of the absorbent to be fed to the tank.

According to an aspect of the present invention, in the wet type flue gas desulfurization apparatus, an opening is provided on an upper end of the tank, and a cover member is detachably attached to cover the opening of the tank.

According to another aspect of the present invention, the wet type flue gas desulfurization apparatus further includes an auxiliary perforated plate extending upward from the upper surface of the perforated plate and having multiple transmission holes. In the wet type flue gas desulfurization apparatus, the absorbent passes through the transmission holes of the perforated plate while the scales or impurities contained in the absorbent are collected by the perforated plate.

The present invention can achieve the following effects. In the wet type flue gas desulfurization apparatus according to an aspect of the present invention, clogging of a circulation path for the absorbent, which may occur due to scales and impurities, can be prevented. In addition, the wet type flue gas desulfurization apparatus can be stably operated, and a maintenance operation can be easily carried out for the wet type flue gas desulfurization apparatus.

One skilled in the art may have greater understanding of the purpose of the present invention described above, other purposes of the present invention other than those described above, embodiments of the present invention, and the effects of the present invention by referring to the following detailed description of the present invention described with reference to the attached drawings.

DESCRIPTION OF THE EMBODIMENTS

First Preferred Embodiment

A wet type flue gas desulfurization apparatus according to the First Preferred Embodiment of the present invention (hereinafter simply referred to as a "FGD apparatus") will be described below.

Figure 1:
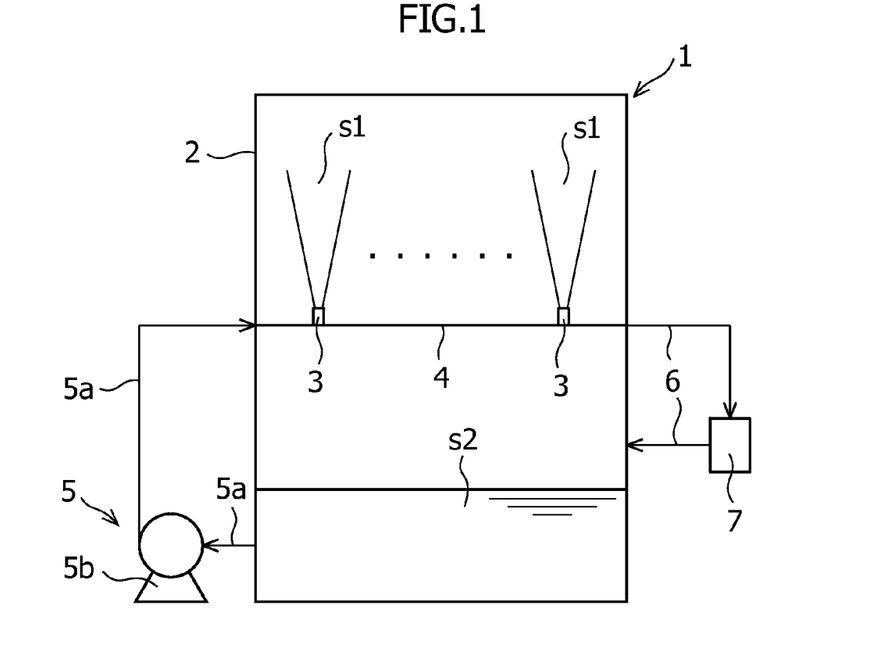
FIG. 1 is a schematic view showing a wet type flue gas desulfurization apparatus according to a First Preferred Embodiment of the present invention.

Referring to FIG. 1, the FGD apparatus 1 includes a substantially hollow absorption tower 2. Although not described in the drawings, flue gas containing sulfur oxides ($SO_x$), such as sulfur dioxide ($SO_2$), is fed into the absorption tower 2. Furthermore, after being fed into the absorption tower 2, the flue gas is desulfurized by using an absorbent, and then the desulfurized flue gas is discharged to the outside of the absorption tower 2. Note that the FGD apparatus 1 according to the present Preferred Embodiment of the present invention employs the limestone gypsum method. In the present Preferred Embodiment, limestone slurry that uses limestone (calcium carbonate ($CaCO_3$)) is used as the absorbent.

Figure 2:
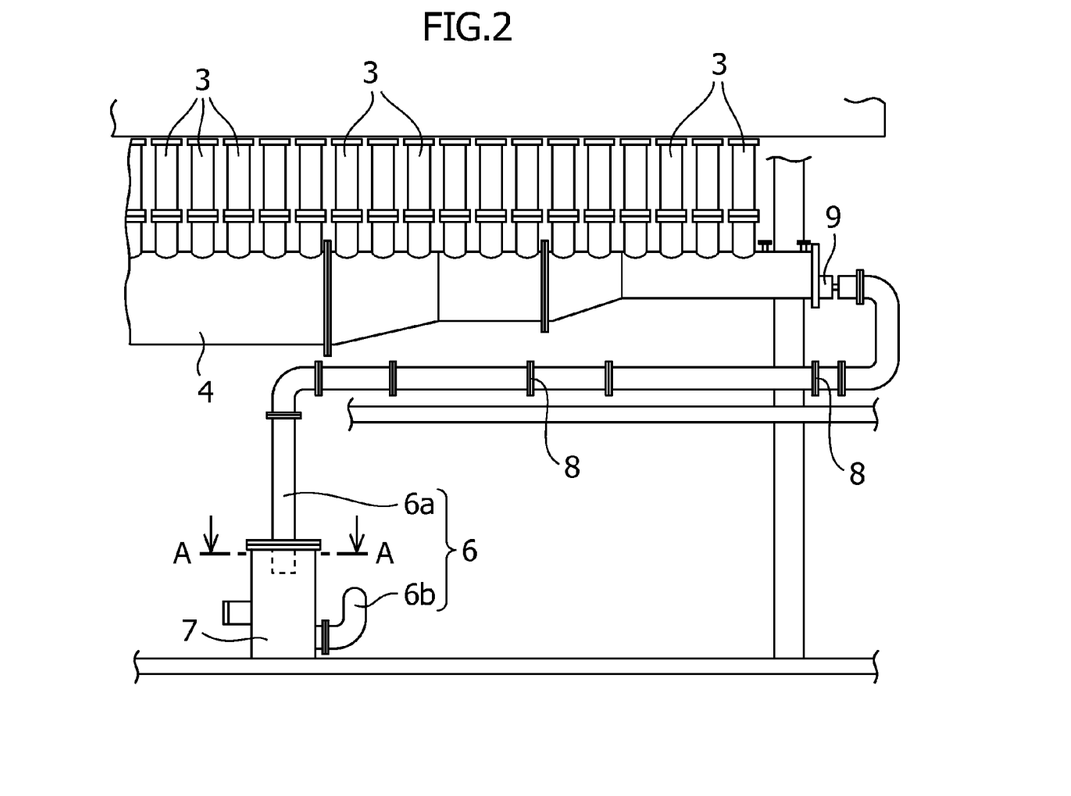
FIG. 2 is a front view schematically showing a bypass pipe and a tank according to the First Preferred Embodiment of the present invention and the periphery thereof.
Figure 3:
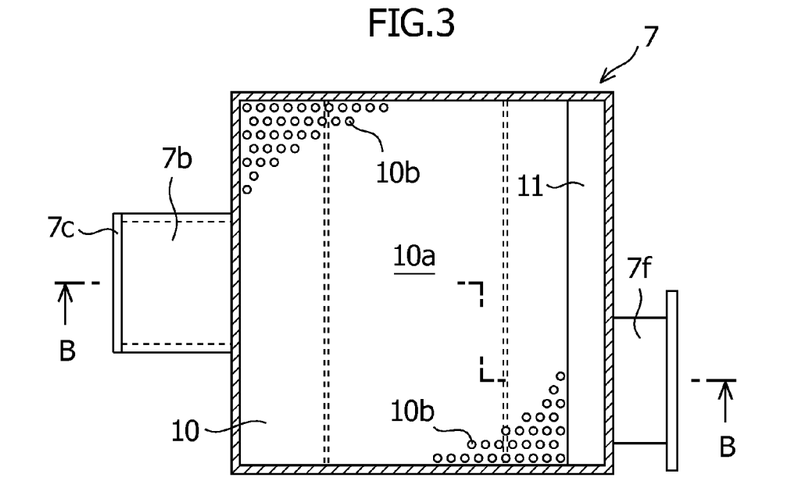
FIG. 3 is a longitudinal section of the tank according to the First Embodiment of the present invention cut along line A-A in FIG. 2.
Figure 4:
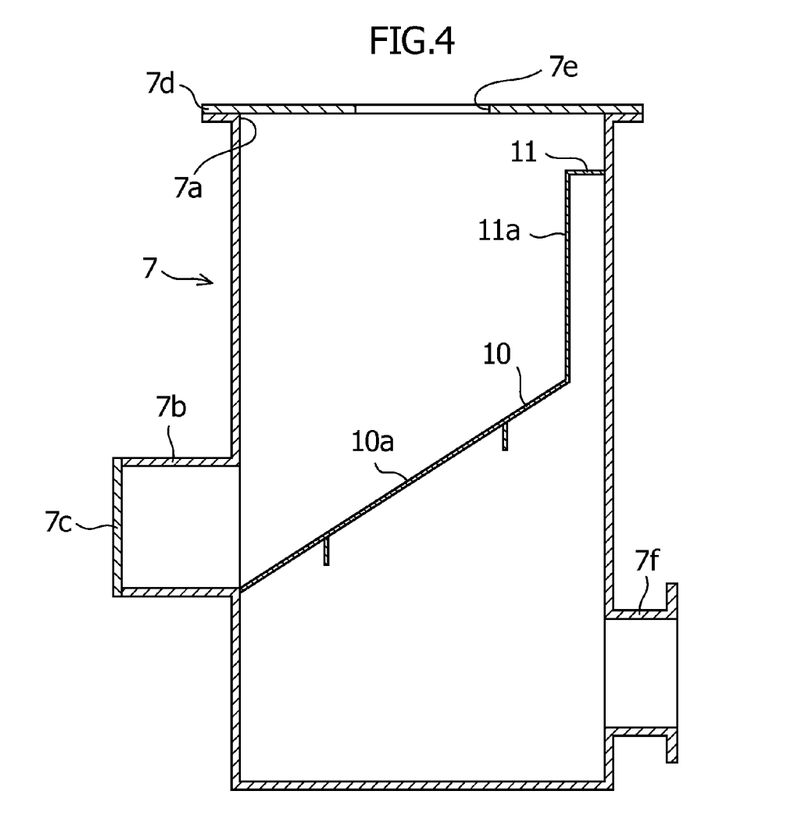
FIG. 4 is a cross section of the tank according to the First Preferred Embodiment of the present invention cut along line B-B in FIG. 3.

Returning to FIG. 1, the FGD apparatus 1 includes multiple nozzles 3 that are configured to spray an absorbent to the inside of the absorption tower 2. A header pipe 4 is connected to the multiple nozzles 3 so that the absorbent is supplied from the header pipe 4 to the nozzles 3 (refer to a sprayed absorbent s1 shown in FIG. 1). The absorbent s1 sprayed to the inside of the absorption tower 2 accumulates on the bottom of the absorption tower 2 (refer to an accumulated absorbent s2 shown in FIG. 1). Accordingly, in order to contact the accumulated absorbent s2 with the flue gas for the desulfurization in the inside of the absorption tower 2, the FGD apparatus 1 is provided with a circulation mechanism 5. The circulation mechanism 5 is configured to feed the absorbent accumulated on the bottom of the absorption tower 2 to an upstream side of the nozzles 3 of the header pipe 4 in the direction of flow of the absorbent (hereinafter simply referred to as the "upstream side"). In addition, the FGD apparatus 1 includes a bypass pipe 6 for supplying the absorbent from a downstream side of the nozzles 3 of the header pipe 4 in the direction of flow of the absorbent (hereinafter simply referred to as the "downstream side"). The absorbent flowing in the circulation path may contain: scales, such as calcium sulfite ($CaSO_3$) or calcium sulfate ($CaSO_4$) or the like, which may be generated in the desulfurization; and impurities which may intrude from outside. In order to eliminate the scales and impurities (hereinafter collectively referred to as "scales etc."), a tank 7, which is capable of collecting the scales etc., is arranged at an intermediate location on the bypass pipe 6, in which the absorbent flows. Referring to FIGS. 2 through 4, the tank 7 is provided with an opening 7a on its upper end.

The nozzles 3 and the header pipe 4 will be described in detail below with reference to FIGS. 1 and 2. Referring to FIGS. 1 and 2, the multiple nozzles 3 are arranged apart from one another in the direction of the flow of the absorbent in the header pipe 4. The nozzles 3 spray the absorbent upward from below. Referring to FIG. 2, the header pipe 4 extends in the horizontal direction of the FGD apparatus 1. The header pipe 4 is gradually tapered in the direction from the upstream side toward the downstream side.

The circulation apparatus 5 will be described in detail below with reference to FIG. 1. Referring to FIG. 1, the circulation apparatus 5 is provided with a circulation pipe 5a for connecting the absorption tower 2 and the header pipe 4 on the bottom of the absorption tower 2 and the upstream-side end of the header pipe 4. A pump 5b is attached to the circulation pipe 5a. The pump 5b is configured to feed the absorbent s2 accumulated on the bottom of the absorption tower 2 to the upstream-side end of the header pipe 4 via the circulation pipe 5a.

The bypass pipe 6 and the tank 7 will be described in detail below with reference to FIGS. 1 through 6. Referring to FIGS. 1 and 2, the bypass pipe 6 includes: the supply portion 6a which is located on the upstream side of the tank 7; and a discharge portion 6b which is located on the downstream side of the tank 7. Referring to FIG. 2, the bypass pipe 6 is connected with the header pipe 6a on its upstream-side end attached to the downstream-side end of the header pipe 4. As shown in FIG. 1, the downstream-side end of the supply portion 6a is inserted into the inside of the tank 7 through the opening 7a of the tank 7 (the downstream-side end of the supply portion 6a of the bypass pipe 6 is shown by broken lines in FIG. 2). In the supply portion 6a of the bypass pipe 6, two restriction orifices 8 are arranged apart from each other in the direction of the flow of the absorbent. The restriction orifices 8 are configured to control the flow rate of the absorbent fed to the tank 7 through the supply portion 6a of the bypass pipe 6. In addition, a flow rate control valve 9 is provided at a location on the supply portion 6a of the bypass pipe 6 upstream of the two restriction orifices 8 provided thereto. The flow rate control valve 9 is configured to control the flow rate of the absorbent fed to the tank 7 via the supply portion 6a of the bypass pipe 6 by opening and closing the flow rate control valve 9. Note that the operation for opening and closing the flow rate control valve 9 can be either manually or automatically performed. The discharge portion 6b of the bypass pipe 6 is connected with the tank 7 on its upstream-side end attached to the bottom of the tank 7. The discharge portion 6b is attached to the absorption tower 2 on its downstream-side end.

Figure 5:
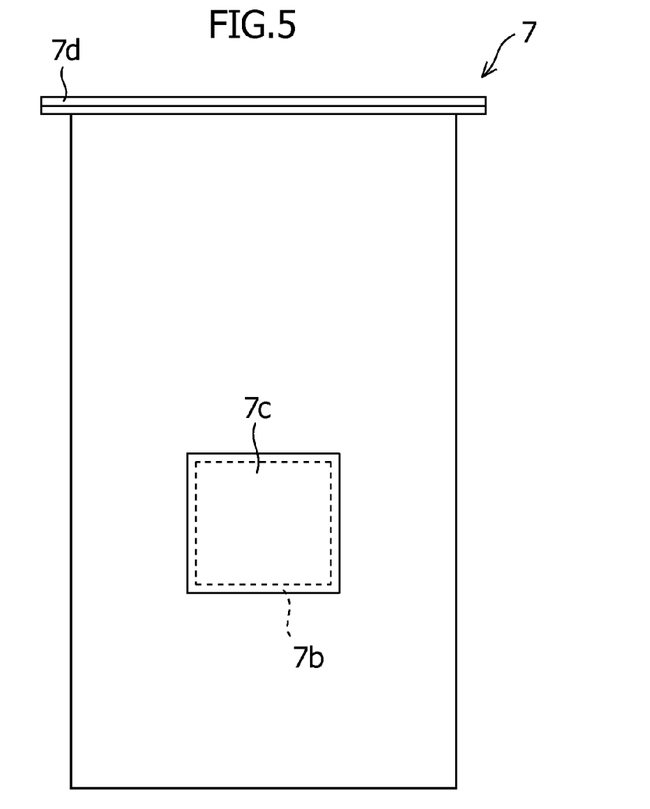
FIG. 5 is a front view showing the tank according to the First Preferred Embodiment of the present invention.

Referring to FIGS. 3 through 5, the tank 7 has a substantially box-shape. The tank 7 is provided with an access port 7b. The access port 7b has a cylindrical shape and protrudes from the periphery of an opening hole (shown by broken lines in FIG. 5), and the opening hole is formed on a side surface of the tank 7. The access port 7b is configured to communicate between the inside and the outside of the tank 7. In addition, a door member 7c for opening and closing the access port 7b is attached to the tank 7. The access port 7b has a substantially rectangular cross section. The door member 7c has a rectangular shape corresponding to the shape of the access port 7b. Referring to FIGS. 4 and 5, a cover member 7d is detachably attached to cover the opening 7a provided on the upper end of the tank 7. In addition, an insertion hole 7e is formed through the cover member 7d. The insertion hole 7e corresponds to the downstream-side end of the supply portion 6a of the bypass pipe 6, and this downstream-side end is inserted into the inside of the tank 7 through the opening 7a of the tank 7. As shown in FIG. 2, the downstream-side end of the supply portion 6a of the bypass pipe 6 is inserted into the inside of the tank 7 through the insertion hole 7e (the downstream-side end of the supply portion 6a of the bypass pipe 6 is shown with broken lines in FIG. 2). Referring to FIGS. 3 and 4, the tank 7 is provided with a discharge port 7f. The discharge port 7f has a cylindrical shape and protrudes from the periphery of the opening hole formed on the side surface of the bottom of the tank 7. The bypass pipe 6 is connected with the tank 7 on its upstream-side end of the discharge portion 6b attached to the discharge port 7f of the tank 7.

Figure 6:
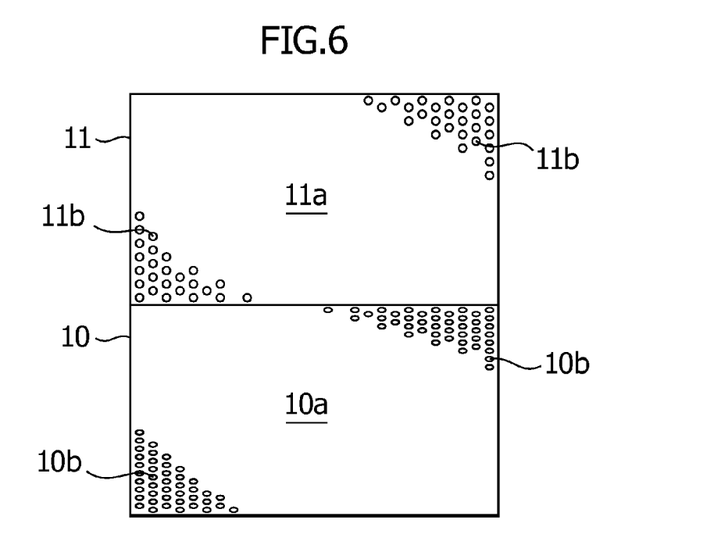
FIG. 6 is a front view showing a perforated plate according to the First Preferred Embodiment of the present invention.

Referring to FIGS. 3 and 4, in the inside of the tank 7, a perforated plate 10 is arranged below the access port 7b and above the discharge port 7f. The perforated plate 10 partitions the tank 7 into the upstream side and the downstream side. Referring to FIG. 4, the perforated plate 10 has an upper surface 10a inclined upward from below toward the access port 7b in the horizontal direction. The perforated plate 10 and the access port 7b are arranged such that a lower end of the inclined upper surface 10a of the perforated plate 10 and a lower end of the access port 7b are located at substantially the same height. Referring to FIGS. 3 and 6, multiple transmission holes 10b are formed on the upper surface 10a of the perforated plate 10. The multiple transmission holes 10b are formed through the perforated plate 10 in the upper and lower direction. Note that although the multiple transmission holes 10b are provided through the entire upper surface 10a of the perforated plate 10, some of the multiple transmission holes 10b are omitted in FIGS. 3 and 6 to facilitate understanding. With the above-described configuration of the perforated plate 10, when an absorbent containing scales etc. is fed onto the upper surface 10a of the perforated plate 10, the absorbent passes through the multiple transmission holes 10b of the perforated plate 10 while the scales etc. are collected on the upper surface 10a of the perforated plate 10.

Referring to FIGS. 3, 4, and 6, the perforated plate 10 includes an auxiliary meshed portion 11 which extends upward from an upper end portion of the upper surface 10a. The perforated plate 10 and the auxiliary meshed portion 11 are integrally formed. Referring to FIG. 4, the auxiliary meshed portion 11 has a substantially L-like shape in cross section. Referring to FIG. 6, multiple transmission holes 11b are formed on the entire side surface 11a of the auxiliary meshed portion 11 extending in the upper and lower direction of the tank 7. The multiple transmission holes 11b are formed through the auxiliary meshed portion 11 in the horizontal direction. Note that although the multiple transmission holes 11b are provided on the entire side surface 11a of the auxiliary meshed portion 11, some of the multiple transmission holes 11b are omitted in FIG. 6. With the above-described configuration of the auxiliary meshed portion 11, when an absorbent containing scales etc. is fed onto a side surface 11a of the auxiliary meshed portion 11, the absorbent passes through the multiple transmission holes 11b provided on the side surface 11a of the auxiliary meshed portion 11 while the scales etc. are collected on the side surface 11a of the auxiliary meshed portion 11.

Now, an exemplary method for using the FGD apparatus 1 and an exemplary method for collecting scales etc. according to the present Preferred Embodiment will be described below.

The absorbent s2 accumulated on the bottom of the absorption tower 2 is pumped up by the pump 5b of the circulation mechanism 5, and then, the pumped absorbent is fed to the upstream-side end of the header pipe 4 through the circulation pipe 5a. After being fed to the header pipe 4, the absorbent is fed to the nozzles 3. The absorbent is then sprayed by the nozzles 3 into the inside of the absorption tower 2. The sprayed absorbent s1 reacts with the flue gas fed into the inside of the absorption tower 2 to absorb sulfur oxides contained in the flue gas. Subsequently, the sprayed absorbent falls to accumulate on the bottom of the absorption tower 2. The absorbent s2 accumulated on the bottom of the absorption tower 2 is pumped up by the pump 5b of the circulation mechanism 5, and then, the pumped absorbent is fed again to the upstream-side end of the header pipe 4 through the circulation pipe 5a so as to be contacted with flue gas to desulfurize the same. More specifically, the absorbent can be circulated through the circular path including the absorption tower 2, the circulation pipe 5a, the header pipe 4, the nozzles 3, and the absorption tower 2 in this order.

The part of the absorbent that has not been sprayed from the nozzles 3, is fed to the tank 7 through the supply portion 6a of the bypass pipe 6. When the absorbent passes through the supply portion 6a of the bypass pipe 6, the restriction orifices 8 and the flow rate control valve 9 control the flow rate of the absorbent. After being fed to the tank 7, the absorbent passes through the multiple transmission holes 10b that are formed on the upper surface 10a of the perforated plate 10 primarily, by free fall while scales etc. are collected on the upper surface 10a of the perforated plate 10. After passing through the perforated plate 10, the absorbent is fed through the discharge portion 6b of the bypass pipe 6 to enter the absorption tower 2 and accumulates on the bottom of the absorption tower 2. More specifically, the absorbent can also be circulated through the circular path including the absorption tower 2, the circulation pipe 5a, the header pipe 4, the supply portion 6a of the bypass pipe 6, the tank 7, the discharge portion 6b of the bypass pipe 6, and the absorption tower 2 in this order.

If all the multiple transmission holes 10b formed on the upper surface 10a are stopped up with the scales etc. accumulated on the entire upper surface 10a of the perforated plate 10, the absorbent accumulates in a portion above the scales etc. remaining on the upper surface 10a. In this case, the absorbent accumulated in a portion above the scales etc. passes through the multiple transmission holes 11b that are formed on the side surface 11a of the auxiliary meshed portion 11, while the scales etc. are collected on the side surface 11a of the auxiliary meshed portion 11.

Now, an exemplary method for removing scales etc. collected by the FGD apparatus 1 according to the present Preferred Embodiment of the present invention will be described below.

The scales etc. collected on the upper surface 10a of the perforated plate 10 are displaced toward the access port 7b due to the slope of the upper surface 10a. Accordingly, most of the scales etc. accumulate in the periphery of the access port 7b. In removing the scales etc. accumulated as described above, a worker or the like opens the door member 7c to open the access port 7b. In this state, the worker or the like takes out the accumulated scales etc. through the access port 7b to the outside of the tank 7.

As described above, according to the FGD apparatus 1 of the present Preferred Embodiment of the present invention, the scales etc. can be securely collected by the perforated plate 10. Accordingly, the scales etc. accumulated on the upper surface 10a of the perforated plate 10 can be easily taken out through the access port 7b which is located on the upper side of the perforated plate 10, to the outside of the FGD apparatus 1. As a result, clogging in the absorbent circulation path that may occur due to the scales etc. can be prevented and a maintenance operation for the FGD apparatus 1 can be easily carried out. In addition, the tank 7 used for collecting the scales etc. is arranged at an intermediate location on the bypass pipe 6, which is branched from the main circulation path. Accordingly, the scales etc. accumulated in the tank 7 can be taken out through the access port 7b while the FGD apparatus 1 is in operation. Therefore, contrary to the related techniques, it is not necessary to stop the operation of the FGD apparatus 1 to perform a maintenance operation for removing scales etc. Accordingly, the FGD apparatus 1 can be stably and continuously operated.

In addition, according to the FGD apparatus 1 of the present Preferred Embodiment of the present invention, the scales etc. accumulated on the upper surface 10a of the perforated plate 10 are displaced toward the access port 7b due to the slope of the upper surface 10a. In addition, in removing the scales etc. through the access port 7b, the scales etc. can be easily guided to the access port 7b due to the slope of the upper surface 10a. Therefore, the scales etc. accumulated on the upper surface 10a of the perforated plate 10 can be easily taken out through the access port 7b which is located on the upper side of the perforated plate 10, to the outside of the FGD apparatus 1. Accordingly, a maintenance operation for the FGD apparatus 1 can be easily performed.

According to the FGD apparatus 1 of the present Preferred Embodiment of the present invention, if the absorbent cannot pass through the upper surface 10a of the perforated plate 10 due to the scales etc. accumulated on the upper surface 10a of the perforated plate 10, the absorbent passes through the multiple transmission holes 11b of the auxiliary meshed portion 11 in a portion above the scales etc. accumulated on the upper surface 10a of the perforated plate 10 and the scales etc. are collected by the auxiliary meshed portion 11. Accordingly, if the scales etc. have accumulated on the entire upper surface 10a of the perforated plate 10, the FGD apparatus 1 can be stably operated.

According to the FGD apparatus 1 of the present Preferred Embodiment of the present invention, the amount of the absorbent to be fed to the tank 7 is controlled by the restriction orifices 8 and the flow rate control valve 9 which are provided to the supply portion 6a of the bypass pipe 6, according to the change in the flow rate of the absorbent. For example, if a large amount of absorbent is abruptly fed to the bypass pipe 6, the absorbent can be prevented from overflowing from the tank 7 because the restriction orifices 8 and the flow rate control valve 9 reduce the flow rate of the absorbent to be fed to the tank 7 in this case. Accordingly, it becomes unnecessary to stop the operation of the FGD apparatus 1 to stop such overflow. In addition, since the absorbent is prevented from overflowing, it becomes unnecessary to clean-up an overflowed absorbent. Therefore, a maintenance operation can be easily carried out for the FGD apparatus 1.

According to the FGD apparatus 1 of the present Preferred Embodiment of the present invention, if the fluid level of the absorbent inside the tank 7 is about to rise beyond the upper end of the tank 7, and the absorbent is likely to flow out from the opening 7a, the cover member 7d can prevent the absorbent from overflowing to the outside of the tank 7. Accordingly, since the absorbent is prevented from overflowing, it becomes unnecessary to clean up an overflowed absorbent. As a result, a maintenance operation can be easily carried out for the FGD apparatus 1.

Second Preferred Embodiment

A FGD apparatus according to the Second Preferred Embodiment of the present invention will be described below. The FGD apparatus according to the present Preferred Embodiment basically has a configuration similar to that of the FGD apparatus according to the First Preferred Embodiment. Therefore, in the description below, components similar to those of the First Embodiment are provided with the same reference symbols and names as those of the First Preferred Embodiment, and configurations different from those of the First Preferred Embodiment only will be described.

Figure 7:
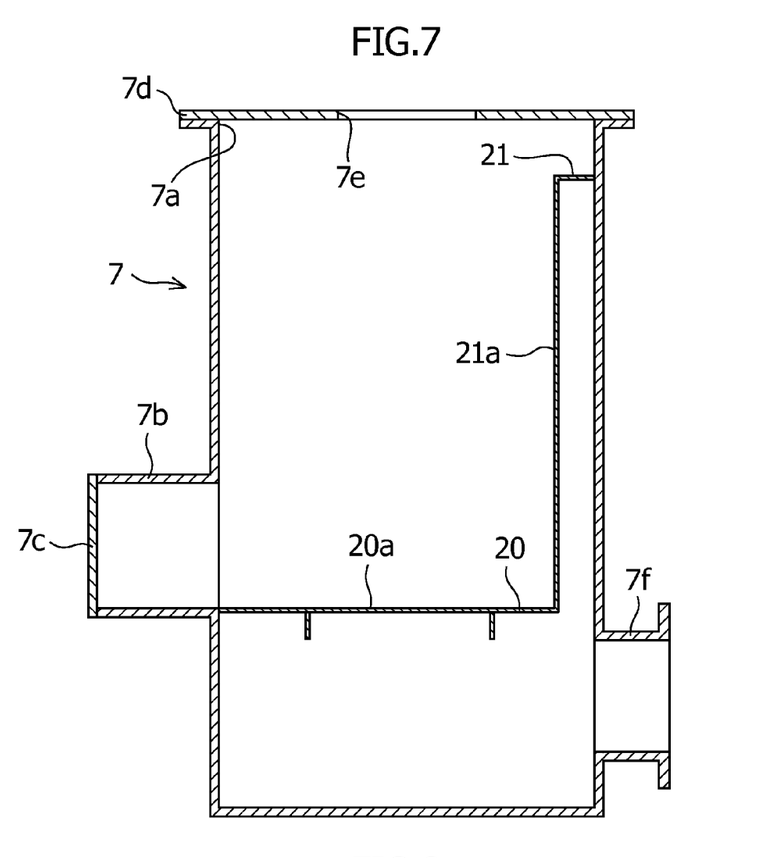
FIG. 7 is a cross section of a tank included in a wet type flue gas desulfurization apparatus according to a Second Preferred Embodiment of the present invention cut along line B-B in FIG. 3, as in the First Preferred Embodiment.

Referring to FIG. 7, a perforated plate 20 is provided inside the tank 7 and below the access port 7b. The perforated plate 20 is configured to partition the tank 7 into the upstream side and the downstream side. The perforated plate 20 has a horizontal upper surface 20a. The perforated plate 20 and the access port 7b are arranged such that a lower end of the upper surface 20a of the perforated plate 20 and a lower end of the access port 7b are located at substantially the same height. Although not shown in the drawings, multiple transmission holes are formed on the upper surface 20a of the perforated plate 20. The multiple transmission holes are formed through the perforated plate 20 in the upper and lower direction. With the above-described configuration of the perforated plate 20, when an absorbent containing scales etc. is fed onto the upper surface 20a of the perforated plate 20, the absorbent passes through the multiple transmission holes of the perforated plate 20 while the scales etc. are collected on the upper surface 20a of the perforated plate 20.

Figure 8:
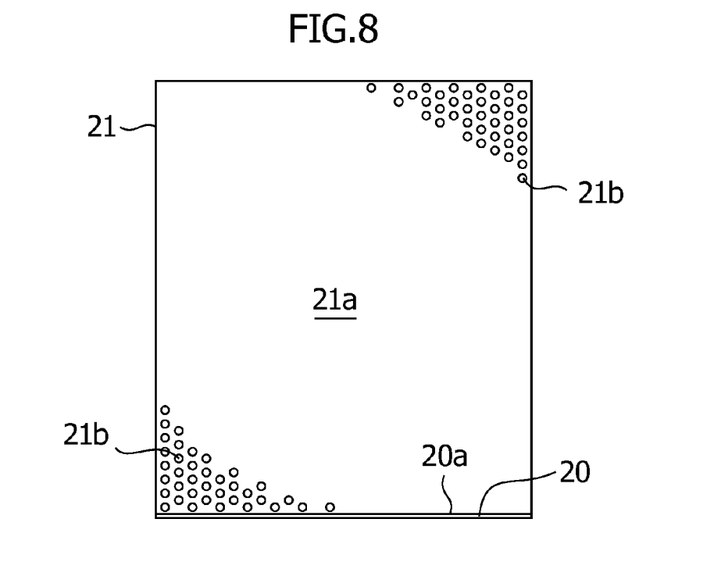
FIG. 8 is a front view showing a perforated plate according to the Second Embodiment of the present invention.

Referring to FIG. 7, the perforated plate 20 is provided with an auxiliary meshed portion 21, which extends upward from the upper surface 20a thereof. The perforated plate 20 and the auxiliary meshed portion 21 are integrally formed. Referring to FIG. 8, the auxiliary meshed portion 21 extends from a portion facing the access port 7b, which is provided on a peripheral edge of the upper surface 20a. Returning to FIG. 7, the auxiliary meshed portion 21 has a substantially L-like shape in cross section. Referring to FIG. 8, multiple transmission holes 21b are formed on the entire side surface 21a of the auxiliary meshed portion 21 extending in the upper and lower direction of the tank 7. The multiple transmission holes 21b are formed through the auxiliary meshed portion 21 in the horizontal direction. Note that although the multiple transmission holes 21b are provided on the entire side surface 21a of the auxiliary meshed portion 21, some of the multiple transmission holes 21b are omitted in FIG. 8. With the above-described configuration of the auxiliary meshed portion 21, when an absorbent containing scales etc. is fed onto a side surface 21a of the auxiliary meshed portion 21, the absorbent passes through the multiple transmission holes 21b which are provided on the side surface 21a of the auxiliary meshed portion 21, while the scales etc. are collected on the side surface 21a of the auxiliary meshed portion 21.

In the present Preferred Embodiment of the present invention, the method for using the FGD apparatus and the method for collecting scales etc. are similar to those of the First Preferred Embodiment.

An exemplary method for removing scales etc. collected by the FGD apparatus according to the present Preferred Embodiment of the present invention will be described below. In removing the scales etc. accumulated on the upper surface 20a of the perforated plate 20, a worker or the like opens the door member 7c to open the access port 7b. In this state, the worker or the like takes out the accumulated scales etc. through the access port 7b to the outside of the tank 7.

As described above, according to the present Preferred Embodiment of the present invention, the same effects as those of the First Preferred Embodiment can be achieved except the effect of the First Preferred Embodiment of the present invention achieved by the inclined upper surface 10a of the perforated plate 10.

The Preferred Embodiments of the present invention are described above. However, the present invention is not limited to the above-described Preferred Embodiments. More specifically, various modifications and alterations can implement the present invention on the basis of the technical ideas of the present invention.

For example, as a First Modification of the present invention, slurry that uses slaked limestone (calcium hydroxide ($Ca(OH)_2$)) or dolomite as the sorbent can be used as the absorbent. The FGD apparatus 1 can employ the magnesium hydroxide method. In this case, it is useful to use, as the absorbent, slurry that uses magnesium hydroxide or the like as the sorbent. The FGD apparatus 1 can employ the sodium hydroxide method. In this case, it is useful to use, as the absorbent, slurry that uses sodium hydroxide, sodium sulfate, or the like as the sorbent. The FGD apparatus 1 can employ the ammonia absorption method. In this case, it is useful to use, as the absorbent, slurry that uses ammonia or the like as the sorbent. The First Modification of the present invention can achieve the same effects as those of each of the Preferred Embodiments of the present invention.

As a Second Modification of the present invention, the nozzles 3 can spray the absorbent downwards, in the horizontal direction, or in an inclined direction. The Second Modification of the present invention can achieve the same effects as those of each of the Preferred Embodiments of the present invention.

As a Third Modification of the present invention, the header pipe 4 can include a bent portion, a warped portion, a portion extending in the upper and lower direction, an inclined portion, or the like. The Third Modification of the present invention can achieve the same effects as those of each of the Preferred Embodiments of the present invention.

As a Fourth Modification of the present invention, the header pipe 4 can have a substantially uniform thickness entirely from its upstream side portion to its downstream side portion. The Fourth Modification of the present invention can achieve the same effects as those of each of the Preferred Embodiments of the present invention.

As a Fifth Modification of the present invention, the quantity of the restriction orifices 8 can be one or three or more. The Fifth Modification of the present invention can achieve the same effects as those of each of the Preferred Embodiments of the present invention.

As a Sixth Modification of the present invention, the tank 7 can have a substantially circular cylindrical shape, a substantially polygonal cylindrical shape, a substantially conical shape, a substantially polygonal pyramid shape, a substantially spherical shape, a substantially semispherical shape, a substantially oval spherical shape, or a substantially semioval spherical shape. The Sixth Modification of the present invention can achieve the same effects as those of each of the Preferred Embodiments of the present invention.

As a Seventh Modification of the present invention, the access port 7b can have a cross section having: a substantially polygonal shape other than a substantially rectangular shape; a substantially circular shape; a substantially semicircular shape; a substantially oval shape; a substantially semioval shape; a substantially quadrant shape, and the like; or a shape including any one of the above-described shapes and the rectangular shape. The Seventh Modification of the present invention can achieve the same effects as those of each of the Preferred Embodiments of the present invention.

As an Eighth Modification of the present invention, the multiple transmission holes 10b (not shown in the Second Preferred Embodiment) of the upper surface 10a, 20a of the perforated plate 10, 20 can be formed in a part of the upper surface 10a, 20a. The Eighth Modification of the present invention can achieve the same effects as those of each of the Preferred Embodiments of the present invention.

As a Ninth Modification of the present invention, the auxiliary meshed portion 11, 21 can be formed separately from the perforated plate 10, 20. The Ninth Modification of the present invention can achieve the same effects as those of each of the Preferred Embodiments of the present invention.

As a Tenth Modification of the present invention, the transmission hole 11b of 21a, 21b formed on the side surface 11a, 21a of the auxiliary meshed portion 11, 21 can be formed in a part of the side surface 11a, 21a. The Tenth Modification of the present invention can achieve the same effects as those of each of the Preferred Embodiments of the present invention.

What is claimed is:

1. A wet type flue gas desulfurization apparatus comprising:

an absorption tower configured to desulfurize flue gas by causing the flue gas to come into gas-liquid contact with an absorbent;

nozzles configured to spray the absorbent into the absorption tower;

a header pipe configured to feed the absorbent to the nozzles;

a circulation mechanism configured to feed the absorbent accumulated inside the absorption tower through the nozzles of the header pipe toward an upstream of a flow of the absorbent;

a bypass pipe configured to feed the absorbent through the nozzles of the header pipe from a downstream of the nozzles into the absorption tower in a direction of flow of the absorbent;

a tank arranged at an intermediate location on the bypass pipe in the direction of flow of the absorbent;

a perforated plate being arranged inside the tank and having multiple transmission holes; and an access port that opens on a side surface of the tank to communicate between an inside and an outside of the tank;

wherein the access port is arranged above the perforated plate, and wherein the absorbent that freely falls inside the tank and passes through the transmission holes of the perforated plate while scales or impurities contained in the absorbent are collected above the perforated plate.

2. The wet type flue gas desulfurization apparatus according to claim 1, wherein
the perforated plate is provided with an upper surface configured to incline upward from below in the horizontal direction toward the access port.

3. The wet type flue gas desulfurization apparatus according to claim 2, further comprising:
an auxiliary meshed portion extending upward from an upper end portion of the inclined upper surface of the perforated plate, and having multiple transmission holes,
wherein the absorbent passes through the transmission holes of the auxiliary perforated plate while the scales and the like or impurities contained in the absorbent are collected by the auxiliary meshed portion.

4. The wet type flue gas desulfurization apparatus according to claim 1, further comprising:
Restriction orifices arranged on the bypass pipe in the upstream of the tank; and
a flow rate control valve arranged on the bypass pipe in the upstream of the tank;
wherein the restriction orifices and the flow rate control valve can control the flow rate of the absorbent to be fed to the tank.

5. The wet type flue gas desulfurization apparatus according to claim 1,
wherein an opening is provided on an upper end of the tank, and
wherein a cover member is detachably attached to cover the opening of the tank.

6. The wet type flue gas desulfurization apparatus according to claim 1, further comprising:
an auxiliary perforated plate extending upward from the upper surface of the perforated plate, and having multiple transmission holes,
wherein the absorbent passes through the transmission holes of the perforated plate while the scales or impurities contained in the absorbent are collected by the perforated plate.

* * * * *